United States Patent Office 3,147,075
Patented Sept. 1, 1964

3,147,075
PROCESS FOR PRODUCING ANHYDROUS LITHIUM PEROXIDE BY THE USE OF A SUBSTANTIALLY WATER-IMMISCIBLE ORGANIC LIQUID
Ricardo O. Bach and William W. Boardman, Jr., Gastonia, N.C., assignors to Lithium Corporation of America, Inc., New York, N.Y., a corporation of Minnesota
No Drawing. Filed Oct. 22, 1962, Ser. No. 232,293
12 Claims. (Cl. 23—184)

This invention relates to a new and particularly advantageous method of producing substantially anhydrous lithium peroxide.

It has been found, in accordance with this invention, that substantially anhydrous lithium peroxide of high quality and inexcellent yield can be produced in a markedly efficient and economical manner by a procedure which includes contacting a reaction mixture of hydrogen peroxide and lithium hydroxide with a substantially water-immiscible organic liquid capable of forming a binary heteroazeotrope with the water present in the reaction mixture.

It has long been known, as shown in U.S. Patent No. 2,488,485, that anhydrous lithium peroxide can be formed in an organic liquid medium, for instance, ethanol or n-propanol or mixtures of n-propanol with benzene, which forms a homogeneous azeotrope with the water in the reaction mixture, and then subjecting the mixture to simple distillation to remove the azeotrope. The method of the patent has a number of significant disadvantages, particularly from an economic standpoint, which makes its utilization in commercial operations open to practical difficulties.

In the particularly preferred embodiments of said patent, wherein the organic liquid utilized in n-propanol, very large quantities of the n-propanol are required to produce only a modest quantity of the lithium peroxide. More specifically, of the order of at least 20, and as high as 50 or more, parts by weight of n-propanol are shown to be utilized to prepare only 1 part of anhydrous lithium peroxide.

Apart from the unfavorable product to organic liquid-volume ratios of the method of the aforementioned patent, correspondingly larger capacity equipment, in addition to greater quantities of thermal energy, are required to accomplish the formation and recovery of the lithium peroxide. These cost-increasing factors are further aggravated by the fact that the distillate obtained in the practice of the method of said patent is obtained in the form of a homogeneous azeotrope. From the standpoint of practical commercial considerations, it is unfeasible to discard such a solvent-rich material. The less costly course of action would dictate subjection of the homogeneous azeotropic distillate to a separate solvent recovery procedure. In either event, the costs of carrying out the method of the referred to patent are substantially augmented.

In accordance with the practice of the present invention, a method of producing substantially anhydrous lithium peroxide has been evolved which requires minimal volumes of organic liquid to remove the water from the lithium hydroxide-hydrogen peroxide reaction mixture, which can be carried out with equipment whereby the quantity of the lithium peroxide produced is such that substantially optimum productivity of the equipment is realized, and which, furthermore, eliminates the need for subsequent separation techniques to recover the organic liquid employed in the method.

The objectives of the present invention advantageously are achieved by forming a reaction mixture of an aqueous solution of hydrogen peroxide with lithium hydroxide and bringing the thus formed mixture into contact with a substantially water-immiscible organic liquid with respect to which the reaction mixture and the anhydrous lithium peroxide formed are essentially both inert and insoluble. In contacting said substantially water-immiscible organic liquid with the reactants, said organic liquid may be introduced into the lithium hydroxide-hydrogen peroxide reaction mixture, or the reactants may be introduced individually, or in the form of an aqueous slurry, into said organic liquid. Especially desirable results are obtained by forming a reaction mixture or slurry of an aqueous solution of the lithium hydroxide and the hydrogen peroxide and adding the thus formed reaction mixture in increments to the substantially water-immiscible organic liquid while maintaining the latter at the boiling temperature of its water azeotrope. Irrespective of the manner in which the reactants and the said oragnic liquid are brought into contact with one another, said organic liquid acts to form a binary heteroazeotrope with the water present in the reaction zone. The binary heterazeotrope is withdrawn from the reaction zone and condensed, the water being discarded from the condensate and the water-immiscible organic liquid condensate being returned to the reaction zone.

The lithium hydroxide (which term also includes lithium hydroxide hydrates such as lithium hydroxide monohydrate) can be used in the form of a strong to substantially saturated aqueous solution, for instance, from about 5 or 10 to 15%, or more advantageously as a solid having a lithium hydroxide content of 50 to 60%, usually 55%, more or less. The use of lithium hydroxide monohydrate is preferred since it can be obtained substantially free of impurities such as lithium carbonate.

The aqueous hydrogen peroxide component employed in the reaction may vary considerably in strength. Good results may be obtained with aqueous hydrogen peroxide of strength of from 20% to 93%. The strength of the aqueous hydrogen peroxide employed in the method of the present invention bears a direct relationship to the quantity of water required to be removed from the reaction zone to upset the equilibrium of the reaction and drive it to the formation of the lithium peroxide. Thus, in an illustrative example, in producing 100 grams of anhydrous lithium peroxide in accordance with the practice of the present invention, if solid lithium hydroxide monohydrate (55.3% lithium hydroxide) and 30% aqueous hydrogen peroxide are employed as the reagents, approximately 335 milliliters of water will have to be removed from the reaction zone. In other words, a lithium peroxide-to-water ratio of about 1:3.35 is realized. If, on the other hand, 50 to 90% hydrogen peroxide is employed in forming the reaction mixture, the lithium peroxide-to-water ratios are substantially reduced, falling in the approximate ranges 1:1.5 to 1:2. This is in sharp contrast to the procedures in the aforementioned patent where, for instance, the lithium peroxide-to-water ratio is of the order of 1:15 and where the ratio of lithium peroxide-to-water plus organic liquid is vastly greater. Furthermore, again by way of illustration, by the use of the procedures of said patent, because of the large volumes of organic liquid required, such as n-propanol, to produce 1 kg. of anhydrous lithium peroxide a reaction vessel of approximately 65 to 70 liters' capacity is required; whereas, in sharp contrast thereto, to produce the same amount of anhydrous lithium peroxide in accordance with the present invention, a reaction vessel is required of only about 6 to 10 liters volume.

The proportions of the lithium hydroxide and the hydrogen peroxide present in the aqueous reaction mixtures used in the practice of the method of the present invention can be varied within appreciable limits. The generally optimum objectives of the invention, however, are most advantageously achieved with approximately stoichiometric or theoretical proportions of the lithium hydroxide and the hydrogen peroxide, namely, a lithium hydroxide to hydrogen peroxide molar ratio of about 2:1, with especially desirable results being attained when the hydrogen peroxide component is used in slight excess, more specifically, of the order of from 3% to 15%, usually about 10% to 12%, over theoretical.

The substantially water-immiscible organic liquids which are utilized in the practice of this invention to form a binary heteroaezotrope with the water present in the reaction mixture are of the type which are essentialy unreactive with respect both to the reactants, that is, the lithium hydroxide and the hydrogen peroxide, as well as with respect to the substantially anhydrous lithium peroxide formed by the reaction thereof. Such substantially water-immiscible organic liquids enabling the fulfillment of the objectives of the present invention include, for instance, aromatic hydrocarbons, and mixtures thereof, and may be exemplified by benzene, ethylbenzene, toluene, all of the isomers of xylene, cyclohexane, aromatic naphthas, and the like, said organic liquids having a specific gravity less than that of water. Immiscibility of the organic liquids with both the aqueous reaction slurry and water serves to prevent loss of lithium peroxide due to solubility in solvent and, in addition, serves to avoid loss of azeotroping agent dissolved in the water to be discarded. It is critical to the present invention that the organic liquids used in producing the binary heteroazeotropes be non-solvents for lithium peroxide and be immiscible with water. As indicated above, mixtures of the water-immiscible organic liquids can be used provided that they are miscible with each other and that such mixtures are immiscible with water. The resulting systems may, in use in accordance with the present invention, form two or more binary heteroazeotropes with the water removed, and such systems are here considered as binary heteroazeotropic systems. Such systems must be devoid or essentially devoid of water-soluble or water-miscible organic liquids. Xylenes and toluene are especially advantageous organic liquids for use in accordance with the present invention.

In accordance with the practice of this invention, the removal of the water present in the reaction zone is achieved under reflux conditions. The amount of heat required, therefore, to achieve the desired removal of the water from the reaction zone will be determined by the boiling point of the binary heteroazeotrope formed by the aforesaid organic liquid component of the system and the water present. Desirably, the temperature of the system should not reach a point at which decomposition of the lithium peroxide will occur, and this consideration will be a factor in the selection of the organic liquid or liquids utilized to form the binary heteroazeotrope. Generally speaking, with the more readily available water-immiscible organic liquids such as benzene, toluene and the xylenes, the temperature in the reaction zone will not exceed the boiling temperature of the heteroazeotrope, in the case of benzene 69.3° C., toluene 84.1° C. and m-xylene 92° C. The temperature will remain constant at the boiling point of the azeotrope as long as water is present in the reaction mixture. The end of the water removal process is indicated by a rise in the refluxing temperature to that of said organic liquid.

The withdrawal or removal of the binary heteroazeotrope from the reaction zone, the condensation of the vapors of the water and organic liquid constituting the binary heteroazeotrope, and the ultimate separation of the water from the organic liquid, the water being discarded and the organic liquid being returned to the system, may be accomplished in any manner known in the art. Very satisfactory results in this regard have been obtained with a water trap of the types commonly known as Bidwill-Sterling, or Dean-Stark, or Barrett, trap. The result of such an operation is that water essentially alone is retained as a distillate outside the reaction vessel and the amount of the organic liquid used in the reaction vessel remains essentially constant throughout the method. The characteristics of the condensate in such a device serve as a valuable aid in determining the completeness of the removal of the water from the reaction zone. When an essentially single phase condensate is observed in the trap, and also by the rise of the refluxing temperature to that of the pure organic liquid, this is a clear indication that substantially all of the water present in the reaction zone has been removed.

The following are illustrative specific examples of the manner of carrying out the present invention:

*Example I*

To 87 grams of $LiOH.H_2O$ (55.3% LiOH), 102 grams of 35% $H_2O_2$ were added rapidly under dry nitrogen gas with vigorous stirring. The resulting slurry rose in temperature to about 55° C. due to the exothermic reaction. It was allowed to cool to room temperature and then 350 milliliters of toluene were added and the mixture brought to the reflux temperature. A Dean-Stark trap was used to collect the binary heteroazeotropic distillate. After 100 minutes, 97% of the water had been removed from the reaction zone. The mixture was cooled and filtered under dry nitrogen gas pressure in a sintered glass filter funnel. Following filtration, the lithium peroxide reaction product was washed twice, each time with 50 milliliter portions of pentane. It was then filtered to dryness in a dry nitrogen gas stream and then vacuum dried for 2 hours at 100 to 155° C. Next it was stirred for 4 hours in 100 milliliters of anhydrous methanol, filtered under dry nitrogen gas, and rinsed with 50 milliliters of methanol. When nearly dry, it was rinsed with 50 milliliters of pentane and blown dry, and then vacuum dried at about 60° C. The anhydrous lithium peroxide product weight was 40 grams (83% yield) and the active oxygen was 33.2%. The color of the product was light tan.

*Example II*

To 190 grams of $LiOH.H_2O$ (55.3% LiOH), 227 grams of 36.4% $H_2O_2$ were added with stirring. The $H_2O_2$ was present in 11% excess of the stoichiometrically required amount. The temperature rose to 65° C. and then dropped to 41° C. The resulting slurry was transferred to a 500 milliliter dropping funnel and added to 650 milliliters of boiling toluene in small increments (25 milliliters more or less) in 111 minutes. When 73% of the slurry had been added, 11 grams of 36.4% $H_2O_2$ was stirred into the remaining slurry before further additions to the toluene were made. At the end of 162 minutes, at which time there was no evidence of water in the toluene condensate and the vapor temperature stood at 110° C., the binary heteroazeotroping process was halted. Of the calculated 379 milliliters of water, 97% had been removed from the reaction zone. In this example, two Barrett traps were used to collect the distillate.

The reaction product was separated from the toluene by pressure filtration under dry nitrogen gas, slurried with 100 milliliters of dry pentane, filtered, reslurried with 100 milliliters of pentane, and finally slurried with 50 milliliters of hexane, filtered and pumped dry at 20°–30° C. The product weighed 100.9 grams (93% yield) and assayed 92.7% anhydrous lithium peroxide, based on active oxygen analysis.

*Example III*

To 190 grams of $LiOH.H_2O$ (55.3% LiOH), 228 grams of 36.4% $H_2O_2$ were added. The $H_2O_2$ was present in 11% excess of the stoichiometrically required amount. The slurry was added to 600 milliliters of xylene in increments of 60 to 90 milliliters over a period of 53 minutes, the first 90 milliliters of the slurry having been added to the xylene just prior to the time that the xylene approached its heteroazeotroping temperature of 93° C. When all but 38% of the slurry had been added to the xylene, 25 milliliters of 36.4% H₂O₂ was mixed into the slurry. All of the water calculated, 400 milliliters, was collected in two Barrett traps over a period of 97 minutes. The reaction product was collected by pressure filtration on a medium sintered glass filter, washed with three 25 milliliter-portions of dry pentane, slurried and filtered, twice, with 100 milliliters of pentane, and then vacuum dried at 20°–30° C. The resultant anhydrous lithium peroxide product weighed 101.2 grams (94% yield) and assayed 32.6% active oxygen, or 93.7% $Li_2O_2$.

The preferred mode of operation of the method of the present invention is a continuous procedure. In such a continuous procedure, the charge to the reactor, which is large enough to hold sufficient amounts of the reactants to yield the anhydrous lithium peroxide in desired commercial quantities, is advantageously operationally connected to a container for the water-immiscible organic liquid, the container being provided with a reflux condenser having a water trap. The reactor is equipped with metering means to permit incremental additions of the slurry in the reactor to the said organic liquid which is maintained at the reflux temperature. The binary heteroazeotrope formed between the water present in the reacted slurry and the said organic liquid is taken overhead to the condenser and its associated trap. The condensed water is discarded from the system and the condensed water-immiscible organic liquid is returned continuously to the organic liquid container. Removal of the substantially anhydrous lithium peroxide product and the subsequent filtration and washing procedures are then conducted in accordance with conventional practices.

The volume of water-immiscible organic liquid utilized in the method of the present invention remains substantially constant during the run. After separation of the product from the organic liquid, no further processing of the organic liquid is required before its re-use. With respect to such re-use, the amount of water-immiscible organic liquid is substantially independent of the size of production of the anhydrous lithium peroxide. This is not the case with the procedures described in Patent No. 2,488,485, when the azeotropic agent (e.g., n-propanol) is continuously withdrawn from the reaction mixture in the form of a homoazeotropic distillate.

The time periods involved in carrying out the method of this invention are generally less than those required in the practice of conventional methods of producing anhydrous lithium peroxide.

While detailed illustrative procedures for carrying out the method of this invention have been described, it will be understood that various changes and modifications may be made without departing from the spirit of this invention.

What is claimed is:

1. A method of producing substantially anhydrous lithium peroxide comprising forming a reaction mixture of an aqueous solution of hydrogen peroxide with lithium hydroxide, contacting the mixture with a substantially water-immiscible organic liquid in which said reaction mixture and lithium peroxide are substantially insoluble, said organic liquid being in an amount to effect removal of substantially all of the water present in the reaction mixture during the reaction period, forming a binary heteroazeotrope between said organic liquid and the water in the mixture, removing said heteroazeotrope from the reaction zone, condensing and returning said organic liquid to the reaction zone, and separating the lithium peroxide formed from said organic liquid.

2. A method of producing substantially anhydrous lithium peroxide comprising forming a reaction mixture of an aqueous solution of hydrogen peroxide with lithium hydroxide, contacting the mixture with a substantially water-immisicible aromatic hydrocarbon in which said reaction mixture and lithium peroxide are substantially insoluble, said organic liquid being in an amount to effect removal of substantially all of the water present in the reaction mixture during the reaction period, heating the aromatic hydrocarbon to form a binary heteroazeotrope between the hydrocarbon and the water in the mixture, withdrawing said heteroazeotrope from the reaction zone, condensing the vapors of said heteroazeotrope to separate the aromatic hydrocarbon from the water, returning the condensed aromatic hydrocarbon to the reaction zone, and separating the lithium peroxide formed from said aromatic hydrocarbon.

3. A method of producing substantially anhydrous lithium peroxide comprising admixing an aqueous solution of hydrogen peroxide and lithium hydroxide with a substantially water-immiscible organic liquid in which the hydrogen peroxide, the lithium hydroxide and the lithium peroxide reaction product thereof are substantially insoluble, said organic liquid being in an amount to effect removal of substantially all of the water present in the reaction mixture during the reaction period, heating the mixture to remove the water in the form of a binary heteroazeotrope formed between said organic liquid and the water present in the reaction zone, condensing said heteroazeotrope to separate said organic liquid from the water, returning said condensed organic liquid to the reaction zone, and separating the lithium peroxide formed from said organic liquid.

4. A method of producing substantially anhydrous lithium peroxide comprising forming a reaction mixture of an aqueous solution of up to 93% hydrogen peroxide with solid lithium hydroxide hydrate containing up to 60% lithium hydroxide, the hydrogen peroxide being in slight excess over stoichiometric proportions, contacting the mixture with a substantially water-immiscible aromatic hydrocarbon capable of forming a binary heteroazeotrope with the water present in the mixture, said aromatic hydrocarbon being a non-solvent for the reaction mixture and for lithium peroxide and being in an amount to effect removal of substantially all of the water present in the reaction mixture during the reaction period, heating the aromatic hydrocarbon to its heteroazeotroping temperature, removing said heteroazeotrope from the reaction zone and condensing it to separate the aromatic hydrocarbon from the water, continuously returning the condensed aromatic hydrocarbon to the reaction zone, and separating the lithium peroxide formed from the aromatic hydrocarbon.

5. A method of producing substantially anhydrous lithium peroxide comprising forming a reaction mixture of an aqueous solution of about 36.4% hydrogen peroxide with solid lithium hydroxide hydrate containing about 55.3% lithium hydroxide, the hydrogen peroxide being present in an excess of up to 15% over stoichiometric proportions, incrementally contacting the mixture with xylene while maintaining the xylene at its heteroazeotroping temperature, the ratio of xylene to water present in the reaction mixture during the reaction period being about 1.5:1 parts, by volume, withdrawing said binary heteroazeotrope formed between the xylene and the water present in the reaction mixture, condensing the heteroazeotrope to separate the water from the xylene, continuously returning the condensed xylene to the reaction zone, and separating the lithium peroxide formed from the xylene in the reaction zone.

6. A method of producing substantially anhydrous lithium peroxide comprising forming a reaction mixture of an aqueous solution of about 36.4% hydrogen peroxide with solid lithium hydroxide hydrate containing about 55.3% lithium hydroxide, the hydrogen peroxide being present in an excess of up to 15% over stoichiometric proportions, incrementally contacting the mixture with toluene while maintaining the toluene at its heteroazeotroping temperature, the ratio of toluene to water present in the reaction mixture during the reaction period being about 1.7:1 parts, by volume, withdrawing said binary heteroazeotrope formed between the toluene and the water present in the reaction mixture condensing the heteroazeotrope to separate the water from the toluene, continuously returning the condensed toluene to the reaction zone, and separating the lithium peroxide formed from the toluene in the reaction zone.

7. A method of producing substantially anhydrous lithium peroxide comprising forming a reaction mixture, in the form of a slurry containing water, hydrogen peroxide and lithium hydroxide in proportions in the range of substantially stoichiometric proportions to proportions containing up to 15%, by weight, of hydrogen peroxide in excess of stoichiometric proportions, admixing said slurry with a water-immiscible organic liquid in which said reaction mixture and lithium peroxide are substantially insoluble, said organic liquid being in an amount to effect removal of substantially all of the water present in the reaction mixture during the reaction period, forming a binary heteroazeotrope between said organic liquid and the water in the mixture, removing said heteroazeotrope from the reaction zone, condensing said heteroazeotrope, separating the water therefrom and returning said organic liquid to the reaction zone, and recovering the lithium peroxide from said organic liquid.

8. A method of producing substantially anhydrous lithium peroxide comprising forming a reaction mixture, in the form of a slurry containing water, hydrogen peroxide and lithium hydroxide in proportions in the range of substantially stoichiometric proportions to proportions containing up to 15%, by weight, of hydrogen peroxide in excess of stoichiometric proportions, admixing said slurry with a water-immiscible organic liquid having a specific gravity less than that of water and in which said reaction mixture and lithium peroxide are substantially insoluble, said organic liquid being in an amount to effect removal of substantially all of the water present in the reaction mixture during the reaction period, forming a binary heteroazeotrope between said organic liquid and the water in the mixture, removing said heteroazeotrope from the reaction zone, condensing said heteroazeotrope, separating the water therefrom and returning said organic liquid to the reaction zone, and recovering the lithium peroxide from said organic liquid.

9. A method of producing substantially anhydrous lithium peroxide comprising forming a reaction mixture, in the form of a slurry containing water, hydrogen peroxide and lithium hydroxide in proportions in the range of substantially stoichiometric proportions to proportions containing up to 15%, by weight, of hydrogen peroxide in excess of stoichiometric proportions, adding said slurry incrementally to an approximately boiling water-immiscible organic liquid in which said reaction mixture and lithium peroxide are substantially insoluble, said organic liquid being in an amount to effect removal of substantially all of the water present in the reaction mixture during the reaction period, forming a binary heteroazeotrope between said organic liquid and the water in the mixture, removing said heteroazeotrope from the reaction zone, condensing said heteroazeotrope, separating the water therefrom and returning said organic liquid to the reaction zone, and recovering the lithium peroxide from said organic liquid.

10. A method of producing substantially anhydrous lithium peroxide comprising forming a reaction mixture, in the form of a slurry, containing water, hydrogen peroxide and lithium hydroxide in proportions in the range of substantially stoichiometric proportions to proportions containing up to 15%, by weight, of hydrogen peroxide in excess of stoichiometric proportions, adding said slurry incrementally to an approximately boiling water-immiscible hydrocarbon liquid having a specific gravity less than that of water and in which said reaction mixture and lithium peroxide are substantially insoluble, said organic liquid being in an amount to effect removal of substantially all of the water present in the reaction mixture during the reaction period, forming a binary heteroazeotrope between said organic liquid and the water in the mixture, removing said heteroazeotrope from the reaction zone, condensing said heteroazeotrope, separating the water therefrom and returning said organic liquid to the reaction zone, and recovering the lithium peroxide from said organic liquid.

11. The method of claim 7 wherein the organic liquid is toluene.

12. The method of claim 10 wherein the organic liquid is xylene.

References Cited in the file of this patent

UNITED STATES PATENTS 2,488,485   Winternitz _____ Nov. 15, 1949

OTHER REFERENCES

Hodgman's, "Handbook of Chemistry and Physics," 43rd Ed., 1961, pages 1390–1391, The Chemical Rubber Publishing Co., Cleveland, Ohio.